United States Patent
Oda et al.

(10) Patent No.: US 9,540,485 B2
(45) Date of Patent: Jan. 10, 2017

(54) METHOD FOR PRODUCING POLYAMIDE RESIN

(71) Applicant: Mitsubishi Gas Chemical Company, Inc., Tokyo (JP)

(72) Inventors: Takafumi Oda, Kanagawa (JP); Nobuhide Tsunaka, Kanagawa (JP); Jun Mitadera, Kanagawa (JP); Tomonori Kato, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 14/775,515

(22) PCT Filed: Mar. 5, 2014

(86) PCT No.: PCT/JP2014/055699
§ 371 (c)(1),
(2) Date: Sep. 11, 2015

(87) PCT Pub. No.: WO2014/141978
PCT Pub. Date: Sep. 18, 2014

(65) Prior Publication Data
US 2016/0046765 A1    Feb. 18, 2016

(30) Foreign Application Priority Data

Mar. 14, 2013 (JP) .................. 2013-052130

(51) Int. Cl.

| | | |
|---|---|---|
| *C08G 69/36* | (2006.01) | |
| *C08G 69/26* | (2006.01) | |
| *C08G 69/28* | (2006.01) | |
| *C08L 77/06* | (2006.01) | |
| *B29B 7/48* | (2006.01) | |
| *B29B 7/84* | (2006.01) | |
| *B29C 47/60* | (2006.01) | |
| *B29C 47/76* | (2006.01) | |
| *B29C 47/92* | (2006.01) | |
| *C08L 77/00* | (2006.01) | |
| *B29C 47/00* | (2006.01) | |
| *B29K 77/00* | (2006.01) | |

(52) U.S. Cl.
CPC ............... *C08G 69/26* (2013.01); *B29B 7/481* (2013.01); *B29B 7/842* (2013.01); *B29C 47/6056* (2013.01); *B29C 47/6068* (2013.01); *B29C 47/767* (2013.01); *B29C 47/92* (2013.01); *C08G 69/265* (2013.01); *C08G 69/28* (2013.01); *C08G 69/36* (2013.01); *C08L 77/06* (2013.01); *B29C 47/0004* (2013.01); *B29C 2947/9259* (2013.01); *B29C 2947/92704* (2013.01); *B29K 2077/00* (2013.01); *B29K 2077/10* (2013.01); *C08L 77/00* (2013.01)

(58) Field of Classification Search
CPC ........ C08L 77/00; C08L 77/06; C09D 177/06; C08G 69/36
See application file for complete search history.

(56) References Cited

U.S. PATENT DOCUMENTS

| | | | | |
|---|---|---|---|---|
| 5,929,178 A | * | 7/1999 | Shida ................. | C08K 3/16 428/357 |
| 2013/0303367 A1 | * | 11/2013 | Oda ................. | C08L 77/06 502/402 |

FOREIGN PATENT DOCUMENTS

| | | | |
|---|---|---|---|
| JP | H07-138363 A | | 5/1995 |
| JP | H07-188410 A | | 7/1995 |
| JP | H08-176298 A | | 7/1996 |
| JP | H08-197601 A | | 8/1996 |
| JP | H08-197609 A | | 8/1996 |
| JP | 2003-82095 A | | 3/2003 |
| JP | WO2012/090797 | * | 7/2012 |
| JP | 2012-188557 A | | 10/2012 |

OTHER PUBLICATIONS

Kobelco website (Kobe steel, Ltd.), Mar. 2012.*
International Search Report date of mailing Jun. 3, 2014 for PCT/JP2014/055699 and English translation of the same.

* cited by examiner

*Primary Examiner* — Gregory Listvoyb
(74) *Attorney, Agent, or Firm* — Fitch, Even, Tabin & Flannery LLP

(57) ABSTRACT

A polyamide resin is produced by polycondensing a polyamide oligomer having a relative viscosity of from 1.1 to 1.3 and a water content of 3% by weight or less by melt-kneading using an intermeshed co-rotation twin screw extruder having at least one or more open vents OV1 and OV2 and at least one or more vacuum vents VV1 and VV2. A pressure-decreasing element Y for increasing the resin filling rate is provided at a position nearer to the supply section side than positions at which the vacuum vents VV1 and VV2 are provided, and an area of 30% or less of the total screw length is a vacuum area having a pressure of 300 Torr or less.

9 Claims, 4 Drawing Sheets

METHOD FOR PRODUCING POLYAMIDE RESIN

CROSS-REFERENCE TO RELATED APPLICATIONS

This application is a U.S. national phase application filed under 35 U.S.C. §371 of International Application PCT/JP2014/055699, filed on Mar. 5, 2014, designating the United States, which claims priority from Japanese Application Number 2013-052130, filed Mar. 14, 2013, which are hereby incorporated herein by reference in their entirety.

TECHNICAL FIELD

The present invention relates to a method for producing a polyamide resin from a polyamide oligomer using an intermeshed co-rotation twin screw extruder.

BACKGROUND ART

A polyamide has excellent mechanical properties and processability and has relatively strong gas-barrier performance, and is therefore widely used not only for injection-molding materials for automobile parts, electric-electronic parts and others but also for wrapping/packaging materials for foods, drinks, chemicals, electronic parts and others as well as for industrial materials. For example, a polyamide to be obtained through polycondensation of a xylylenediamine and an aliphatic dicarboxylic acid has high strength and elastic modulus and has low permeability for gaseous substances such as oxygen, carbon dioxide gas, odor, flavor and the like, and is therefore widely used as gas-barrier materials in the field of wrapping/packing materials. In addition, a polyamide has resistance and has gas-barrier performance against alcohols, weakly-alkaline chemicals, weakly-acidic chemicals, fuels, various types of organic solvents, industrial gasses and the like, and is therefore also widely used for materials in the field of industrial application.

Various methods for production of polyamide resins are known. For example, there is known a method that includes: obtaining a polyamide through polycondensation of a dicarboxylic acid component and a diamine component; and then increasing the degree of polymerization of the polyamide according to a solid-phase polymerization method using a heating and drying apparatus such as a tumble drier or the like. However, the solid-phase polymerization method is limitative in producing a resin having a high melting point or in increasing the molecular weight of a resin having low crystallinity, and is therefore problematic in that the method could not provide a resin having a high melting point.

On the other hand, also known is a method of obtaining a polyamide resin by melt-kneading a polyamide oligomer that has been obtained through polycondensation of a dicarboxylic acid component and a diamine component using a twin screw extruder for further polycondensation of the resultant oligomer (for example, see Japanese Patent Document JP-A 2012-188557). The advantages of the twin screw extruder are that an oligomer can be melt-kneaded therein within a short period of time and, in addition, a polyamide resin having a high melting point can be produced, and further, many kinds of products in small quantities can be processed owing to the self-cleaning performance thereof. Accordingly, various methods for producing various types of polyamide resins have been investigated using a twin screw extruder.

SUMMARY OF INVENTION

However, polyamide oligomer polymerization is dehydrating polycondensation and therefore generates a large quantity of water in the reaction process. Consequently, depending on the molecular weight of the oligomer and the water content thereof, a large quantity of water generated during the process would flow backward when the polymerization reaction is carried out in an ordinary kneading operation using a twin screw extruder. In addition, there may occur another trouble in that the vacuum vent for securing the inner pressure inside the cylinder to be a negative pressure would be clogged by the source material that is sucked together with water.

The present invention has been made in consideration of the above-mentioned problems, and an object of the present invention is to provide a polyamide production method capable of producing a polyamide resin having a suitable molecular weight and having a low yellow index by polymerizing a polyamide oligomer using a twin screw extruder, not providing any process trouble.

The present inventors have made assiduous studies and, as a result, have focused on the vacuum area inside the cylinder to be formed by the suction through a vacuum vent and then have found that, in a case where the molecular weight and the water content of the oligomer fall within a specific range, a polyamide resin can be produced not providing any process trouble by adjusting the length of the vacuum area within a predetermined range, and have reached the present invention as described below.

Specifically, the present invention provides the following (1) to (10).

(1) A polyamide resin production method for producing a polyamide resin through polycondensation of a polyamide oligomer, the polyamide oligomer containing a diamine unit containing 70 mol % or more of a diamine unit selected from an aromatic diamine unit represented by the following general formula (I-1) and an alicyclic diamine unit represented by the following general formula (I-2), and a dicarboxylic acid unit containing 50 mol % or more of a dicarboxylic acid unit selected from a linear aliphatic dicarboxylic acid unit represented by the following general formula (II-1) and an aromatic dicarboxylic acid unit represented by the following general formula (II-2), wherein:

in the production method the polyamide oligomer having a relative viscosity of from 1.1 to 1.3 and a water content of 3% by mass or less is melt-kneaded to produce the polyamide resin through polycondensation, using an intermeshed co-rotation twin screw extruder having at least one open vent and at least one vacuum vent, and a pressure-decreasing element is provided at a position nearer to the supply section side than a position at which the vacuum vent is provided, and the area of 30% or less of the total screw length is a vacuum area having a pressure of 300 Torr or less in the extruder:

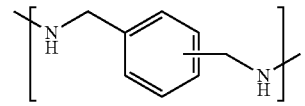

(I-1)

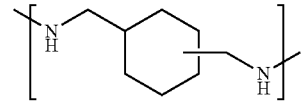

(I-2)

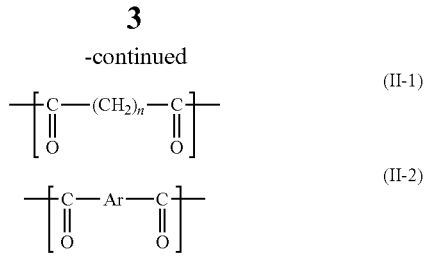

wherein, in the general formula (II-1) n indicates an integer of from 2 to 18, and in the general formula (II-2) Ar represents an arylene group.

(2) The polyamide resin production method according to the above (1), wherein the relative viscosity of the polyamide resin is from 1.8 to 4.0.

(3) The polyamide resin production method according to the above (1) or (2), wherein the molecular weight distribution (Mw/Mn) of the polyamide resin is from 1.8 to 2.5.

(4) The polyamide resin production method according to any of the above (1) to (3), wherein a phosphorus compound is blended in the polyamide oligomer in an amount of from 10 to 500 ppm in terms of the phosphorus atom concentration.

(5) The polyamide resin production method according to any of the above (1) to (4), wherein the open vent is arranged nearer to the supply section side than the vacuum area.

(6) The polyamide resin production method according to any of the above (1) to (5), wherein a kneading section that kneads the polyamide oligomer is provided both in the vacuum area and in the position nearer to the supply section side than the vacuum area.

(7) The polyamide resin production method according to any of the above (1) to (6), wherein at least one vacuum vent is provided in an area of 25% or less of the total screw length from an end on the die side of the extruder.

(8) The polyamide resin production method according to any of the above (1) to (7), wherein a kneading section that has a kneading element having strong distributive mixing performance is provided in the area of 25% or less of the total screw length from an end on the die side of the extruder.

(9) The polyamide resin production method according to any of the above (1) to (8), wherein a kneading section that kneads the polyamide oligomer is provided in a position nearer to the supply section side than the vacuum area and the kneading section has a kneading element having strong dispersive mixing performance.

(10) An article selected from a group consisting of wrapping/packaging materials, wrapping/packaging containers, industrial materials and industrial components, the article formed from the polyamide resin produced according to the polyamide resin production method of any of the above (1) to (9).

The present invention makes it possible to produce a polyamide resin from a polyamide oligomer having a predetermined molecular weight and a predetermined water content, not providing any process trouble.

BRIEF DESCRIPTION OF DRAWINGS

FIG. 3A shows a continuous rotor, and FIG. 3B shows a discontinuous rotor.

DESCRIPTION OF EMBODIMENTS

Figure 1:
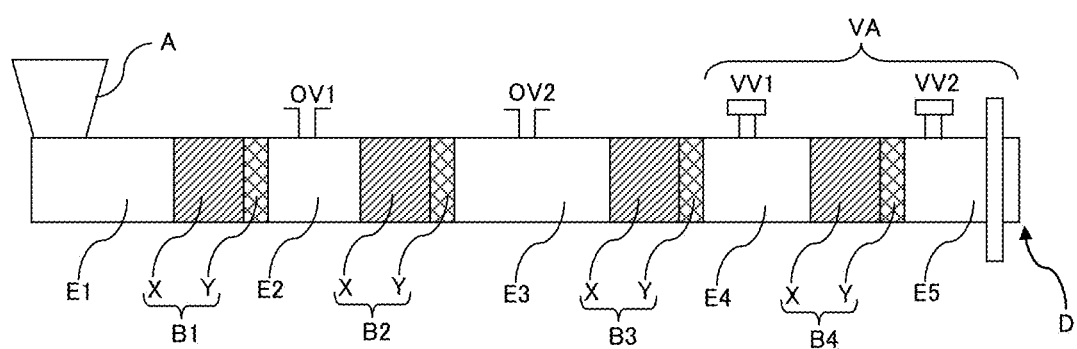
FIG. 1 is a schematic view showing an extruder for use in the present invention.

The present invention is a polyamide resin production method for producing a polyamide resin through polycondensation of a polyamide oligomer, the polyamide resin having a higher molecular weight than the polyamide oligomer.

The present invention is described in more detail hereinunder.

<Polyamide Oligomer>

The polyamide oligomer that is the starting material in the present invention contains a diamine unit and a dicarboxylic acid unit.

Preferably, the content rate of the diamine unit is nearly the same as that of the dicarboxylic acid unit from the viewpoint of the polymerization reaction, and more preferably, the content of the dicarboxylic acid unit is 100±2 mol % of the content of the diamine unit. When the content of the dicarboxylic acid unit falls within the range of 100±2 mol % of the content of the diamine unit, the degree of polymerization of the polyamide resin is easy to increase, the polymerization could finish within a relatively short period of time and the resin would hardly undergo thermal degradation.

Within a range not detracting from the effects of the present invention, the polyamide oligomer may contain any other constitutional unit than the diamine unit and the dicarboxylic acid unit.

[Diamine Unit]

The diamine unit in the polyamide oligomer contains a diamine unit selected from an aromatic diamine unit represented by the following general formula (I-1) and an alicyclic diamine unit represented by the following general formula (I-2), in an amount of 70 mol % or more as a total thereof in the diamine unit of the polyamide oligomer. The content is preferably 80 mol % or more, more preferably 90 mol % or more, and the upper limit thereof is 100 mol %.

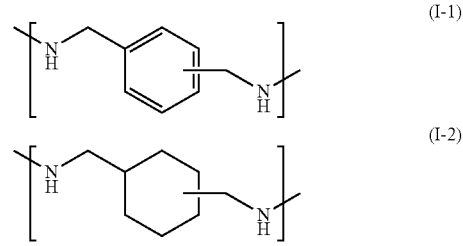

The compound that can constitute the aromatic diamine unit represented by the general formula (I-1) includes orthoxylylenediamine, metaxylylenediamine, and paraxylylenediamine. One alone or two or more of these may be used here either singly or as combined.

The compound that can constitute the alicyclic diamine unit represented by the general formula (I-2) includes bis(aminomethyl)cyclohexanes such as 1,3-bis(aminomethyl)cyclohexane, 1,4-bis(aminomethyl)cyclohexane, etc. One alone or two or more of these may be used here either singly or as combined.

Bis(aminomethyl)cyclohexanes include structural isomers. Having an increased cis-form ratio, the polyamide resin could have higher crystallinity and better moldability. On the other hand, when the cis-form ratio is lowered, a transparent polyamide resin having low crystallinity could be obtained. Accordingly, in a case where the crystallinity of the polyamide resin is desired to be high, it is desirable that the cis-form content ratio in the bis(aminomethyl)cyclohexanes to be employed is 70 mol % or more, more preferably 80 mol % or more, even more preferably 90 mol % or more. On the other hand, in a case where the crystallinity of the polyamide resin is desired to be low, the trans-form content ratio in the bis(aminomethyl)cyclohexanes to be employed is preferably 50 mol % or more, more preferably 60 mol % or more, most preferably 70 mol % or more.

In the present invention, since the diamine unit in the polyamide oligomer contains at least one of the aromatic diamine unit represented by the general formula (I-1) and the alicyclic diamine unit represented by the general formula (I-2), the produced polyamide resin can be given excellent gas-barrier performance, improved transparency and color tone and improved moldability. From the viewpoint of improving the oxygen absorption performance and the properties of the resultant polyamide resin, preferably, the polyamide oligomer contains the aromatic diamine unit represented by the general formula (I-1).

From the viewpoint of making the polyamide resin have excellent gas-barrier performance and further easily realizing the moldability of general purpose thermoplastic resins, the diamine unit in the polyamide oligomer preferably contains a metaxylylenediamine unit in an amount of 70 mol % or more. The content is more preferably 80 mol % or more, even more preferably 90 mol % or more, and the upper limit thereof is 100 mol %.

As compounds that can constitute any other diamine unit than the diamine unit represented by any of the formulae (I-1) and (I-2), there are exemplified linear aliphatic diamines having a carbon number of from 2 to 18, preferably a carbon number of from 2 to 12, such as ethylenediamine, 1,3-propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, etc.; aromatic diamines such as paraphenylenediamine, etc.; alicyclic diamines such as 1,3-diaminocyclohexane, 1,4-diaminocyclohexane, etc.; other aliphatic diamines than linear aliphatic diamines, such as N-methylethylenediamine, 2-methyl-1,5-pentanediamine, 1-amino-3-aminomethyl-3,5,5-trimethylcyclohexane, etc.; ether bond-having polyether diamines as typified by Huntsman Corporation's Jeffamin and Elastamine (both trade names), etc., but the compounds are not limited thereto. One alone or two or more of these may be used here either singly or as combined.

[Dicarboxylic Acid Unit]

The dicarboxylic acid unit in the polyamide oligomer contains a dicarboxylic acid unit selected from a linear aliphatic dicarboxylic acid unit represented by the following general formula (II-1) and an aromatic dicarboxylic acid unit represented by the following general formula (II-2), in an amount of 50 mol % or more as a total thereof in the dicarboxylic acid unit of the polyamide oligomer, from the viewpoint of the reactivity in polymerization and of the crystallinity and the moldability of the polyamide resin. The content is preferably 70 mol % or more, more preferably 80 mol % or more, even more preferably 90 mol % or more, and the upper limit thereof is 100 mol %.

In the general formula (II-1), n indicates an integer of from 2 to 18, and in the general formula (II-2), Ar represents an arylene group.

The linear aliphatic dicarboxylic acid unit represented by the general formula (II-1) is preferred from the viewpoint that the polyamide resin to be obtained according to the production method of the present invention can be thereby given a suitable glass transition temperature and crystallinity and can be additionally given flexibility necessary for, for example, wrapping/packaging materials and wrapping/packaging containers.

In the general formula (II-1), n indicates an integer of from 2 to 18, preferably from 3 to 16, more preferably from 4 to 12, even more preferably 4 to 8.

As the compound that can constitute the linear aliphatic dicarboxylic acid unit represented by the general formula (II-1), there are exemplified succinic acid, glutaric acid, adipic acid, pimelic acid, suberic acid, azelaic acid, sebacic acid, 1,10-decanedicarboxylic acid, 1,11-undecanedicarboxylic acid, 1,12-dodecanedicarboxylic acid, etc., but the compound is not limited thereto. One alone or two or more of these may be used here either singly or as combined.

The type of the linear aliphatic dicarboxylic acid unit represented by the general formula (II-1) can be suitably determined depending on the intended use thereof. The linear aliphatic dicarboxylic acid unit preferably contains at least one selected from a group consisting of an adipic acid unit, a sebacic acid unit and a 1,12-dodecanedicarboxylic acid unit in an amount in total of 50 mol % or more in the linear aliphatic dicarboxylic acid unit, from the viewpoint of imparting excellent gas-barrier performance to the polyamide resin and, in addition, from the viewpoint that the wrapping/packaging materials and the wrapping/packaging containers can still keep heat resistance after thermal sterilization thereof. The content is more preferably 70 mol % or more, even more preferably 80 mol % or more, and particularly preferably 90 mol % or more, and the upper limit thereof is 100 mol %.

From the viewpoint of the gas-barrier performance and the suitable thermal properties such as the glass transition temperature or the melting point of the polyamide resin, the linear aliphatic dicarboxylic acid unit in the polyamide oligomer preferably contains an adipic acid unit in an amount of 50 mol % or more in the linear aliphatic dicarboxylic acid unit. From the viewpoint of imparting suitable gas-barrier performance and molding workability to the polyamide resin, the linear aliphatic dicarboxylic acid unit in the polyamide oligomer preferably contains a sebacic acid unit in an amount of 50 mol % or more in the linear aliphatic dicarboxylic acid unit. In a case where the polyamide resin is used for those that are required to have low water absorbability, weatherability, and heat resistance, the linear aliphatic dicarboxylic acid unit preferably contains a 1,12-dodecanedicarboxylic acid unit in an amount of 50 mol % or more.

The aromatic dicarboxylic acid unit represented by the general formula (II-2) is preferred, from the viewpoint that further gas-barrier performance to the polyamide resin can be imparted and the molding workability can be improved in forming wrapping/packaging materials and wrapping/packaging containers.

In the general formula (II-2), Ar represents an arylene group. The arylene group is preferably an arylene group having a carbon number of from 6 to 30, more preferably a carbon number of from 6 to 15, and the examples thereof include a phenylene group, a naphthylene group, etc.

As the compound that can constitute the aromatic dicarboxylic acid unit represented by the general formula (II-2), there are exemplified terephthalic acid, isophthalic acid, 2,6-naphthalenedicarboxylic acid, etc., but the compound is not limited thereto. One alone or two or more of these may be used here either singly or as combined.

The type of the aromatic dicarboxylic acid unit represented by the general formula (II-2) can be suitably determined depending on the intended use thereof. The aromatic dicarboxylic acid unit in the polyamide oligomer preferably contains at least one selected from a group consisting of an isophthalic acid unit, a terephthalic acid unit, and a 2,6-naphthalenedicarboxylic acid unit in an amount in total of 50 mol % or more in the aromatic dicarboxylic acid unit. The content is more preferably 70 mol % or more, even more preferably 80 mol % or more, and particularly preferably 90 mol % or more, and the upper limit thereof is 100 mol %. Further, of those, at least one of isophthalic acid and terephthalic acid is preferably contained in the aromatic dicarboxylic acid unit. The content ratio of the isophthalic acid unit to the terephthalic acid unit (isophthalic acid unit/terephthalic acid unit) is not particularly limited, and may be suitably determined depending on the intended use thereof. For example, from the viewpoint of suitably lowering the glass transition temperature and the crystallinity, the molar ratio thereof is preferably from 0/100 to 100/0, more preferably from 0/100 to 60/40, even more preferably from 0/100 to 40/60, and most preferably from 0/100 to 30/70, provided that the total number of the two units in the ratio is taken as 100.

In the dicarboxylic acid unit of the polyamide oligomer, the content ratio of the above-mentioned linear aliphatic dicarboxylic acid unit to the aromatic dicarboxylic acid unit (linear aliphatic dicarboxylic acid unit/aromatic dicarboxylic acid unit) is not specifically limited, and may be suitably determined depending on the intended use thereof. For example, for elevating the glass transition temperature of the polyamide resin and lowering the crystallinity of the polyamide resin, the molar ratio of linear aliphatic dicarboxylic acid unit/aromatic dicarboxylic acid unit is preferably from 0/100 to 60/40, more preferably from 0/100 to 40/60, even more preferably from 0/100 to 30/70, provided that the total number of the two units in the ratio is taken as 100.

Alternatively, for lowering the glass transition temperature of the polyamide resin to thereby impart flexibility to the polyamide resin, the molar ratio of the linear aliphatic dicarboxylic acid unit/aromatic dicarboxylic acid unit is preferably from 40/60 to 100/0, more preferably from 60/40 to 100/0, even more preferably from 70/30 to 100/0, provided that the total number of the two units in the ratio is taken as 100.

As compounds that can constitute any other dicarboxylic acid unit than the dicarboxylic acid unit represented by the general formula (II-1) or (II-2), there are exemplified dicarboxylic acid such as oxalic acid, malonic acid, fumaric acid, maleic acid, 1,3-benzene-diacetic acid, 1,4-benzene-diacetic acid, etc., but the compounds are not limited thereto.

[Relative Viscosity and Water Content of Polyamide Oligomer]

As the index of indicating the molecular weight of the polyamide oligomer and that of the polyamide resin to be described below, there is a relative viscosity. In the present invention, the relative viscosity of the polyamide oligomer is from 1.1 to 1.3. The water content of the polyamide oligomer is 3% by mass or less. In the present invention, with the relative viscosity and the water content each falling within the above-mentioned range, the polyamide resin can be produced by further polymerizing the polyamide oligomer according to the production method to be described below, not providing any process trouble.

For example, in a case where the water content is more than 3% by mass or where the relative viscosity is less than 1.1, there would occur various troublesome problems. For example, a large quantity of water might jet out through the open vents of the extruder; water vapor might flow back toward the supply section side; and the oligomer might solidify inside the cylinder and therefore could not be extruded out. In addition, it is difficult to increase the molecular weight of the oligomer so that the relative viscosity thereof could be more than 1.3, according to a simple method.

In the present invention, the water content of the polyamide oligomer to be the starting material is preferably 2.5% by mass or less, more preferably 1.8% by mass or less. Not specifically limited but from the viewpoint of process efficiency in that the time for drying the oligomer can be shortened, the water content is preferably 0.5% by mass or more, more preferably 1.0% by mass or more.

[Yellow Index of Polyamide Oligomer]

The yellow index of the polyamide oligomer to be the starting material in the present invention is preferably 10 or less, more preferably 7 or less. Lowering the yellow index of the polyamide oligomer as the starting material makes it possible to obtain a preferable yellow index of the polyamide resin to be produced.

[Production Method for Polyamide Oligomer]

The polyamide oligomer in the present invention is obtained through polycondensation of a diamine component corresponding to the diamine unit of the polyamide resin and a dicarboxylic acid component corresponding to the dicarboxylic acid unit thereof.

The polycondensation may be carried out, for example, according to a melt polycondensation method. Specifically, there may be mentioned a method where a nylon salt that is formed from a dicarboxylic acid component and a diamine component is heated under pressure in the presence of water for polycondensation. In this method, if desired, the reaction may be carried out while the condensation water is removed. The resultant polyamide oligomer can be finally separated from water through flushing or the like to obtain a powdery polyamide oligomer.

As the melt polycondensation method, also mentioned is a method of directly adding a diamine component to a molten dicarboxylic acid component for polycondensation. In this case, for keeping the reaction system in a uniform liquid state, the diamine component is continuously added to the dicarboxylic acid component and during the addition, the reaction system is kept heated so that the reaction temperature is not be lower than the melting point of the polyamide oligomer being produced while developing the polycondensation. During dropwise addition of the diamine component thereto, the reaction system may be kept pressurized.

After the polycondensation reaction, the polyamide oligomer may be suitably dried so as to adjust the water content as described above.

[Phosphorus Atom-Containing Compound, Alkali Metal Compound]

The polyamide oligomer to be the starting material is preferably one to be obtained through polycondensation of a dicarboxylic acid component and a diamine component in the presence of a phosphorus atom-containing compound. In the case where the phosphorus atom-containing compound is blended before the production of the polyamide oligomer, the polymerization efficiency in producing the polyamide oligomer and the polyamide resin can be improved and the polyamide oligomer and the polyamide resin can be prevented from being colored.

The phosphorus atom-containing compound for use herein includes phosphinic acid compounds such as dimethylphosphinic acid, phenylmethylphosphinic acid, etc.; hypophosphorous acid compounds such as hypophosphorous acid, sodium hypophosphite, potassium hypophosphite, lithium hypophosphite, magnesium hypophosphite, calcium hypophosphite, ethyl hypophosphite, etc.; phosphonic acid compounds such as phosphonic acid, sodium phosphonate, potassium phosphonate, lithium phosphonate, potassium phosphate, magnesium phosphonate, calcium phosphonate, phenylphosphonic acid, ethylphosphonic acid, sodium phenylphosphonate, potassium phenylphosphonate, lithium phenylphosphonate, diethyl phenylphosphonate, sodium ethylphosphonate, potassium ethylphosphonate, etc.; phosphonous acid compounds such as phosphonous acid, sodium phosphinate, lithium phosphinate, potassium phosphinate, magnesium phosphinate, calcium phosphinate, phenylphosphonous acid, sodium phenylphosphonite, potassium phenylphosphonite, lithium phenylphosphonite, ethyl phenylphosphonite, etc.; phosphorous acid compounds such as phosphorous acid, sodium hydrogenphosphite, sodium phosphite, lithium phosphite, potassium phosphite, magnesium phosphite, calcium phosphite, triethyl phosphite, triphenyl phosphite, pyrophosphorous acid, etc.

Among these, preferred for use herein are metal hypophosphites such as sodium hypophosphite, calcium hypophosphite, potassium hypophosphite, lithium hypophosphite, etc., since their effects of promoting polycondensation and preventing coloration is enhanced. Sodium hypophosphite is particularly preferred. However, the phosphorus atom-containing compounds usable in the present invention are not limited to the above.

The amount of the phosphorus atom-containing compound to be blended is preferably from 10 to 500 ppm in terms of the phosphorus atom concentration in the polyamide oligomer, more preferably from 20 to 300 ppm. When the amount is 10 ppm or more, the polycondensation reaction can go on at a suitable speed and coloration hardly occur during the polycondensation reaction. When the amount is 500 ppm or less, the polyamide oligomer and the polyamide resin hardly gel and, in addition, incorporation of fish eyes that may be caused by the phosphorus atom-containing compound is suppressed in formed articles, and therefore, the appearance of formed articles can be good.

The polyamide oligomer to be the starting material may also be obtained through polycondensation in the presence of an alkali metal compound in addition to the phosphorus atom-containing compound.

For preventing the polyamide resin and the polyamide oligomer from being colored, a sufficient amount of a phosphorus atom-containing compound is required to be present, but the presence of the phosphorus atom-containing compound would cause gelation of the polyamide oligomer and the polyamide resin sometimes. With blending the alkali metal compound in addition to the phosphorus atom-containing compound, the amidation reaction speed can be controlled and then the gelation can be prevented, consequently.

As the alkali metal compound, preferred are an alkali metal hydroxide, an alkali metal acetate, an alkali metal carbonate, an alkali metal alkoxide, etc. Specific examples of the alkali metal compound usable in the present invention include lithium hydroxide, sodium hydroxide, potassium hydroxide, rubidium hydroxide, cesium hydroxide, lithium acetate, sodium acetate, potassium acetate, rubidium acetate, cesium acetate, sodium methoxide, sodium ethoxide, sodium propoxide, sodium butoxide, potassium methoxide, lithium methoxide, sodium carbonate, etc., but any others not limited thereto are usable herein. The ratio (molar ratio) of the phosphorus atom-containing compound to the alkali metal compound in the polyamide oligomer, phosphorus atom-containing compound/alkali metal compound is preferably within a range of 1.0/0.05 to 1.0/1.5, from the viewpoint of controlling the polymerization speed and reducing the yellow index, more preferably from 1.0/0.1 to 1.0/1.2, and even more preferably from 1.0/0.2 to 1.0/1.1.

<Polyamide Resin>

The polyamide resin to be obtained according to the production method of the present invention has a diamine unit and a dicarboxylic acid that are same as those in the polyamide oligomer. In addition, the resin may also contain any other optional unit than the diamine unit and the dicarboxylic acid unit, same as the polyamide oligomer.

[Molecular Weight of Polyamide Resin]

According to the production method of the present invention to be described below, the polyamide resin can have a sufficiently increased high molecular weight and can therefore have an increased relative viscosity. The relative viscosity of the polyamide resin obtained according to the production method of the present invention is preferably from 1.8 to 4.0, more preferably from 2.0 to 3.5. When the relative viscosity is 1.8 or more, the polyamide resin obtained in the present invention can be utilized without causing a problem of moldability to be caused by melt viscosity insufficiency during molding. On the other hand, when the melt viscosity is 4.0 or less, the polyamide resin obtained in the present invention can be utilized without causing a problem of moldability to be caused by excessively high melt viscosity during molding.

[Distribution of Polyamide Resin]

The index to indicate the dispersity of the polyamide resin is a molecular weight distribution (Mw/Mn). The polyamide resin obtained in the present invention has a relatively low distribution. Specifically, Mw/Mn of the polyamide resin is preferably from 1.8 to 2.5, more preferably from 1.8 to 2.3. When the molecular weight distribution is 1.8 or more, there can be no problem in moldability. When the molecular weight distribution is 2.5 or less, due to decreasing the amount of the low-molecular weight components, the resin can have excellent heat resistance and impact resistance while lessening discoloration in molding the resin at high temperatures and in processing the molded articles at high temperatures.

[Water Content of Polyamide Resin]

The water content of the polyamide resin obtained in the present invention is low, since it is well dehydrated as described below. Specifically, the water content is preferably 0.3% or less, more preferably 0.1% or less. In addition, the water content thereof is 0.01% or more, for example, for producing the polyamide resin efficiently. The water content as referred to herein is a value measured after cooling the resin in air (by air-cooling).

For cooling the strand of the resin obtained by extrusion from an extruder to be mentioned below, there may be mentioned an air-cooling method and a water-cooling method of cooling the resin in a water bath, but the method is not limited to these. In the case of a water-cooling method, the resin can be cooled rapidly, but the method may require a drying step. In the case of an air-cooling method, the drying step can be omitted, but the method may require some distance for cooling.

[Yellow Index of Polyamide Resin]

The yellow index of the polyamide resin obtained in the present invention can be controlled to be a low value, due to low heat history by heating. Specifically, the yellow index is preferably 30 or less, more preferably 25 or less.

[Melting Point of Polyamide Resin]

In the present invention, even a polyamide resin having a high melting point can be produced according to the production method to be described below. The melting point of polyamide resin is, for example, 220° C. or higher, but in the present invention, even a polyamide resin having a melting point of 300° C. or higher can be produced. The melting point of the polyamide resin is generally 380° C. or lower, preferably 360° C. or lower. The melting point as referred to in this description is, in a case where the polyamide resin has two melting point peaks, the peak temperature on the high temperature side, unless otherwise specifically indicated.

The polyamide resin of the present invention can be formed, for example, into an article including: wrapping/packaging containers for containing and storing therein various products such as various types of liquid drinks, various types of liquid foods, liquid medicines, liquid daily necessities, etc.; wrapping/packaging materials for wrapping and packaging various products such as various foods, various medicines, various daily necessities, various electronic materials, gasolines, various agricultural chemicals, various organic solvents, etc.; industrial materials such as fibers, CFRPs, etc.; and industrial components such as fuel tanks, fuel tubes, connectors, slide members, radiator tanks, engine mounts, connector parts and the like for automobiles, etc., backlight sources for liquid-crystal displays, semiconductor substrate parts, housings for portable phones, personal computers, and the like, and metal-alternative parts.

<Production Method for Polyamide Resin>

In the present invention, the above-mentioned polyamide oligomer is polycondensed to produce a polyamide resin, using an extruder. The extruder for use in the present invention is an intermeshed co-rotation twin screw extruder, and has at least one open vent and at least one vacuum vent. In addition, the extruder has a pressure-decreasing element for increasing the resin or oligomer filling rate in a position nearer to the supply section side than the position at which the vacuum vent is provided, and the area of 30% or less of the total screw length thereof is a vacuum area that has a pressure of 300 Torr or less. The production method of the present invention is described in more detail hereinafter with reference to the drawings.

FIG. 1 is a schematic view showing one example of the extruder for use in the present invention.

The extruder for use in the present invention has a supply section A provided with a supply port such as a hopper or the like at the most upstream position; plural kneading sections B1 to B4 arranged more downstream than the supply section A for kneading and mixing a resin therein; and a die D arranged at the most downstream position. In addition, the extruder further has conveyance sections E1 to E5 for conveying the resin, between the supply section A and the kneading section B1, every between kneading sections B1 to B4, and between the kneading section B4 and the die D. In the example shown in FIG. 1, four kneading sections B1 to B4 are shown, to which, however, the number is not limited, and it may be any number, as long as the extruder has one or more.

However, in a position more upstream than the vacuum area VA, at least one kneading section is preferably arranged, two or more kneading sections are more preferably arranged, and a number of the kneading sections such as three or more may be arranged. In detail, the number of such kneading sections may be three as in FIG. 1, or may be four, or may be more. Also preferably, at least one kneading section is in the vacuum area A.

In general, the intermeshed co-rotation twin screw extruder has two screws that rotate in the same direction inside the cylinder, in which the intermeshing ratio is from 1.2 to 1.7, and is a self-cleaning extruder.

In the present invention, a polyamide oligomer to be a starting material is supplied from the supply section A, and the starting material supplied from the supply section A is, while kept heated, conveyed to the die D via the conveyance sections E1 to E5 and the kneading sections B1 to B4. Here, the polyamide oligomer is heated and melted in the conveyance sections E1 to E5 and in the kneading sections B1 to B4, and kneaded in the kneading sections B1 to B4 for polycondensation, whereby the degree of polymerization thereof is increased, and the resultant polyamide resin is then extruded out through the die D.

In the present invention, though not specifically limited, the polyamide oligomer to be the starting material is supplied from the supply section A in the form of a powder, particles or pellets.

In order that the polyamide resin or oligomer can be melted, kneaded and suitably extruded, the temperature at least in a part inside the extruder is controlled to be higher than the melting point of the polyamide resin to be produced, so that the temperature of the resin that is extruded from the die D is higher than the melting point of the polyamide resin being produced.

The internal temperature of the extruder may be maintained entirely constant, but the extruder may have a region having a relatively low temperature and a region having a relatively high temperature. For example, the most upstream region may be controlled to have a relatively low temperature and the other region may be controlled to have a relatively high temperature, in order to raise the softening temperature of the polyamide and increase the heat resistance thereof, with developing the polymerization reaction. Alternatively, in a case where the polyamide oligomer needs to be filled into the screw with rapidly softening on the upstream side, the temperature on the upstream side may be controlled to be relatively high, the temperature in the intermediate section may be relatively lower, and the temperature on the downstream side may be controlled to be higher than that on the upstream side. Additionally, in a case where the polyamide needs to be prevented from being degraded by heat as much as possible, the temperature on the downstream side may be lowered to a temperature near to the softening temperature of the polyamide not causing any trouble thereon, whereby the resin pressure may be stabilized and the drawability of the strand may be thereby stabilized.

The sites in the screw corresponding to the kneading sections B1 to B4 each is composed of a kneading element X, and a pressure-decreasing element Y arranged downstream of the kneading element X. The kneading element X may be suitably selected from a kneading disc, a rotor, a mixing element, a mixing gear or the like, as described below. Two or more of those elements may be combined to be one kneading element X.

The pressure-decreasing element Y has a pressure-decreasing ability, and increases the resin or oligomer filling rate at the kneading element X in each kneading sections B1 to B4. The pressure-decreasing element Y is composed of a full-flight reverse screw, a sealing disc, or the like. In each kneading section, the pressure-decreasing element Y increases the resin or oligomer filling rate in the section corresponding to the kneading element X, and accordingly, the kneading element X can suitably mix and disperse the resin or the oligomer. In addition, the pressure-decreasing element Y can control the area downstream from the pressure-decreasing element Y to be a negative pressure to provide the vacuum area together with the vacuum vent arranged downstream of the pressure-decreasing element Y, as described below.

The sites in the screw corresponding to the conveyance sections E1 to E5 each is composed of, for example, a feed screw such as a full-flight screw element or the like. The screw form may be a single-thread screw, a double-thread screw or a triple-thread screw, but a double-thread screw is the most widely used.

The extruder is equipped with open vents OV1 and OV2 and vacuum vents VV1 and VV2. In the present invention, the open vents OV1 and OV2 are arranged on the upstream side (namely, the supply section A side), and the vacuum vents VV1 and VV2 are on the downstream side (namely, the die D side). The extruder is sucked via the vacuum vents by a vacuum pump or the like so as to have a negative inside pressure.

More specifically, the vacuum vent VV1 is arranged in the conveyance section E4 between the kneading sections B3 and B4, and the vacuum vent VV2 is arranged in the conveyance section E5 between the kneading section B4 and the die D. Due to these, the region that is downstream of the pressure-decreasing element Y in the kneading section B3 and that is from the conveyance section E4 to the end on the die D side of the extruder is to be the vacuum area VA by the action of the vacuum vents VV1 and VV2.

The number of the vacuum vents and the positioning configuration thereof in FIG. 1 are in one example, and they are not limited thereto. Any number and positioning configuration of those vents are employable, as long as the vacuum area VA that has a predetermined length and a predetermined vacuum degree can be made.

However, in order to secure the vacuum degree in the region on the downstream side and to increase the molecular weight of the polyamide resin or oligomer, it is desirable that at least one vacuum vent is arranged in the range of 25% or less of the total screw length from the end on the die D side of the extruder.

In FIG. 1, the open vents OV1 and OV2 are arranged in the conveyance sections E2 and E3 between the kneading sections B1 and B2 and between the kneading sections B2 and B3, respectively. However, so far as the open vent is in the position nearer to the supply section A side than the vacuum area VA and is arranged more downstream than the kneading section B1 that is the nearest one to the supply section A, the positioning configuration and the number thereof are not particularly limited. When the open vent is arranged more downstream than the kneading section B1, the oligomer that has not been completely melted is prevented from scattering around in the form of powdery, which cause clogging of the open vent.

In a case where the extruder has a number of (for example, 4 or more) kneading sections and conveyance sections that are upstream of the vacuum area VA, the two conveyance sections that are on the most upstream side may not be provided with an open vent while each conveyance section after such two conveyance sections may be provided with an open vent, before the vacuum area VA. For example, in a case where four kneading sections and four conveyance sections are present before the vacuum area VA, the two conveyance sections on the upstream side may not be provided with an open vent while the other two conveyance sections on the downstream side may be provided with an open vent.

The polyamide oligomer in the present invention has a low molecular weight, and in the upstream section in the extruder, the oligomer reacts relatively rapidly to generate a large quantity of water. The large quantity of the generated water is discharged out through the open vents OV1 and OV2 provided on the upstream side, and therefore, the dehydration can be suitably attained, and it is possible to prevent the presence of water from inhibiting the polycondensation reaction. In addition, in the downstream section in the extruder, even though the resin or the oligomer has a low water content and an increased molecular weight, the water content can be suitably lowered under the negative pressure therein and the reaction can thereby further proceed, since the downstream section in the extruder is the vacuum area VA.

In the present invention, it is desirable that the polyamide oligomer is completely melted until it reaches at least the open vent OV1 that is one arranged at the most upstream side.

In a manner that melts the polyamide oligomer before it reaches the open vent OV1, the open vent is not clogged by the powdery oligomer and water can be actively discharged out through the open vent OV1.

In the present invention, the vacuum area VA is in a range of 30% or less of the total screw length. When the range of the vacuum area VA is larger than 30%, the oligomer or the resin would be conveyed to the vacuum area VA in an unmelted or undehydrated state to clog the vacuum vent. From this viewpoint, the length of the vacuum area VA is more preferably 27% or less of the total screw length.

Moreover, the length of the vacuum area VA is preferably 10% or more of the total screw length. When the length of the vacuum area VA is 10% or more, sufficient dehydration is possible and the water content of the polyamide resin to be obtained can be thereby lowered. In addition, the polycondensation reaction can be sufficiently attained and the molecular weight of the polyamide resin to be obtained can be thereby sufficiently increased. From these viewpoints, the length of the above-mentioned vacuum area VA is preferably 15% or more, more preferably 20% or more.

In the present invention, the vacuum degree in the vacuum area VA is kept at 300 Torr or less. When the vacuum degree in the vacuum area VA is higher than 300 Torr, the oligomer could not be sufficiently dehydrated and the water content of the polyamide resin to be obtained could not be sufficiently lowered. In addition, the polycondensation to give the polyamide resin could not be suitably carried out, and the molecular weight of the resin could not be sufficiently increased. Moreover, the yellow index (YI) of the polyamide resin might be high.

The vacuum degree in the vacuum area VA is preferably 200 Torr or less, more preferably 180 Torr or less. When the vacuum degree is not more than these upper limits, the water content of the polyamide resin can be further lowered and the polycondensation reaction can be further developed.

The lower limit of the vacuum degree is not particularly limited, but the vacuum degree may be generally 1 Torr or more in view of the characteristics of the apparatus and the others.

In the present invention, the region more upstream than the vacuum area VA in the extruder is a region having a higher pressure than 300 Torr, and is, in general, a normal-pressure region that is not substantially under a negative pressure. In this region, in general, an inert gas such as nitrogen or the like is introduced from the supply section A.

In the present invention, the vacuum degree is measured at each vacuum vent. For example, in the example of FIG. 1, since the vacuum vent VV1 is for controlling the conveyance section E4 and the kneading section B4 to be a negative pressure, the vacuum degree measured at the vacuum vent VV1 is determined to be the vacuum degree in the conveyance section E4 and the kneading section B4. Similarly, since the vacuum vent VV2 is for controlling the conveyance section E5 and the inside area of the die D to be a negative pressure, and the vacuum degree measured at the vacuum vent VV2 is determined to be the vacuum degree in the conveyance section E5 and inside the die D.

In general, mixing of substances is classified into a dispersive mixing and a distributive mixing. The dispersive mixing means mixing accompanied by particle size reduction, that is, grinding of particles. The distributive mixing means mixing through rearrangement among particles. Also in the present invention, "strong dispersive mixing performance" is meant to indicate mixing in which the mixing mode accompanied by grinding of polyamide oligomer or resin particles is dominant. "Strong distributive mixing performance" is meant to indicate mixing in which the mixing mode with the rearrangement among polyamide oligomer or resin particles is dominant. However, the dispersive mixing may be not without the distributive mixing, or distributive mixing may be not without the dispersive mixing.

Figure 2:
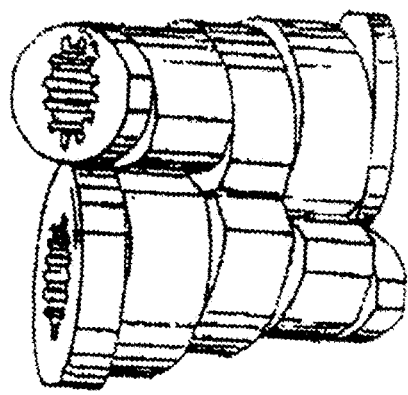
FIG. 2 is a perspective view showing a kneading disc for use in the present invention.
Figures 3A, 3B:
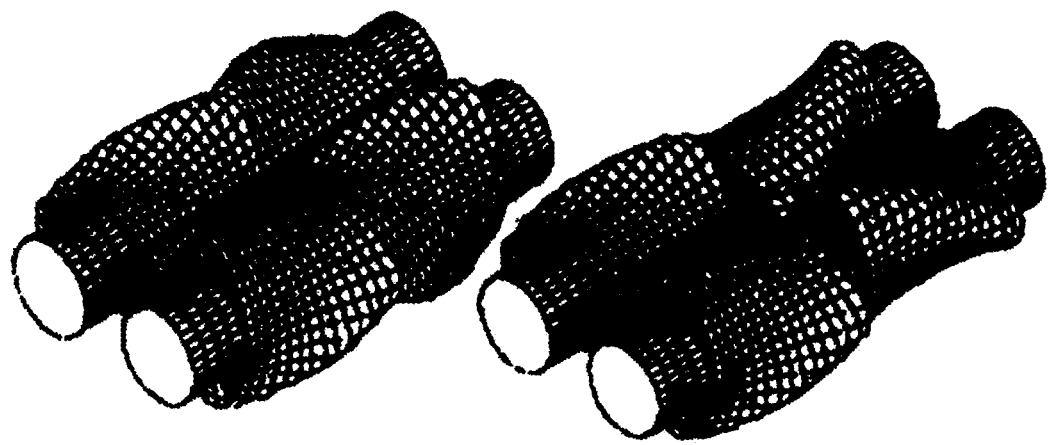
FIGS. 3A and 3B are perspective views each showing a rotor for use in the present invention.

The element having strong dispersive mixing performance includes a kneading disc having a large disc width (see FIG. 2), a rotor (see FIG. 3) and the like among the above-listed kneading elements, but the element is not limited thereto. The kneading disc is composed of a combination of plural discs. The kneading disc having a large disc width is one in which the ratio of the disc width W to the screw diameter D, W/D is from 0.15 to 1.5.

Figure 4:
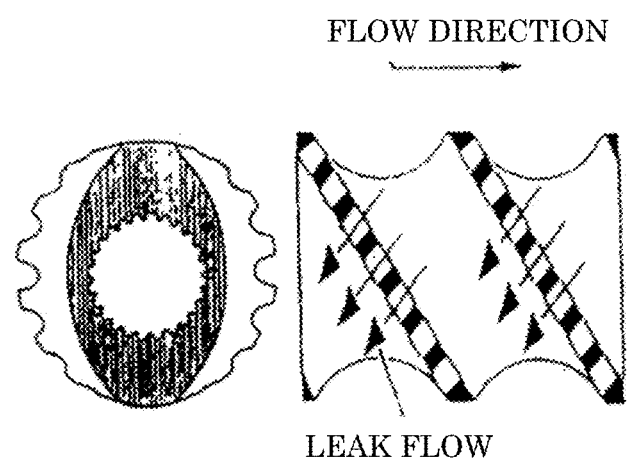
FIG. 4 shows a cross-sectional view and a side view of an SME mixing element for use in the present invention.
Figure 5:
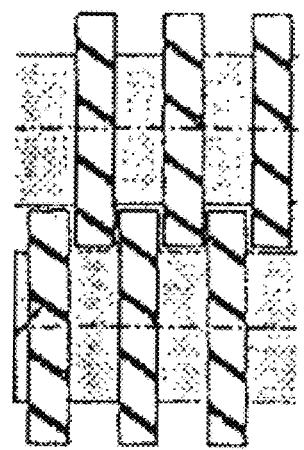
FIG. 5 is a side view showing a mixing gear for use in the present invention.
Figure 6:
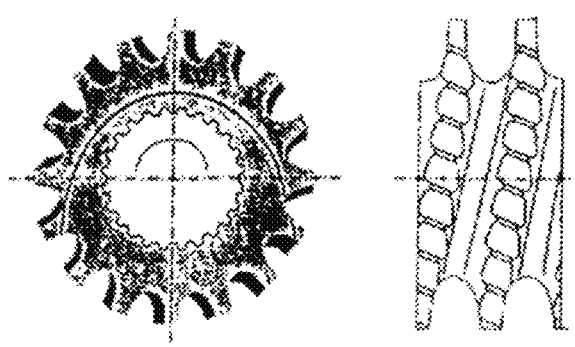
FIG. 6 shows a cross-sectional view and a side view of a ZME mixing element for use in the present invention.

The element having strong distributive mixing performance includes a kneading disc having a small disc width in which the ratio of the disc width W to the screw diameter D, W/D is from 0.02 to less than 0.15, a rotor as shown in FIG. 3, a mixing element as shown in FIG. 4, a mixing gear as shown in FIG. 5, etc., but the element is not limited thereto. The mixing element shown in FIG. 4 is an SME mixing element in which the full-flight forward screw disc is notched. The mixing element may also be a ZME mixing element in which the full-flight reverse screw disc is notched as in FIG. 6. The mixing gear may or may not have self-cleaning performance.

The maximum shear stress given to a material by a rotor is small, as compared with that by a kneading disc, but the rotor has a characteristic in that it can impart uniform shear stress to a material. Accordingly, as described above, the rotor has both relatively strong distributive mixing performance and relatively strong dispersive mixing performance. The rotor may be a continuous type as in FIG. 3A where the cross section smoothly continues, or may be a discontinuous type as in FIG. 3B where the cross section is formed discontinuously.

In the present invention, the kneading element X in each kneading section (in each of the kneading sections B1 to B3 in FIG. 1) that is positioned more upstream than the vacuum area VA is preferably selected from the above-mentioned elements having strong dispersive mixing performance, and is more preferably the kneading disc having a large disc width. Here, one or more of the kneading sections positioned more upstream than the vacuum area VA may be composed of the kneading disc having a large disc width, but preferably, all of those kneading sections are composed of the kneading disc having a large disc width.

The kneading disc having a large disc width that is used in the kneading element X positioned more upstream than the vacuum area VA has the ratio W/D being preferably 0.2 or more, more preferably 0.3 or more. Such an increased ratio W/D further enhances the dispersive mixing performance.

In the present invention, as the kneading element X positioned more upstream than the vacuum area VA, the screw having strong dispersive mixing performance is used, whereby the shear force can be increased and the starting material of the polyamide copolymer being powdery or the like can be formed into a uniform mixture in the position on a relatively upstream side in the extruder.

The kneading element X in the kneading section in the vacuum area VA (in FIG. 1, in the kneading section B4) is preferably an element having strong distributive mixing performance described above, and is more preferably the rotor. In such a manner that uses the screw having strong distributive mixing performance as the kneading section in the vacuum area VA, excessive shear force can be prevented from being given to the polyamide resin or oligomer therein to thereby prevent excess heat generation, whereby YI of the resin can be prevented from increasing. In addition, water can be easily removed during the polymerization reaction and the molecular weight of the resin can be easily increased. Further, gelation can be prevented and the molecular weight of the resin can be prevented from lowering.

In the range of 25% or less of the total screw length from the end on the die D side of the extruder, one or more kneading sections each composed of an element having strong distributive mixing performance are preferably arranged, wherein the kneading section(s) is generally present in the vacuum area VA, and is, for example, the kneading section B4 in FIG. 1. In that manner, in the present invention, an element having strong distributive mixing performance is arranged in a predetermined position on the downstream side, and therefore, the balance between the dispersive mixing and the distributive mixing becomes well. Accordingly, as described above, excessive shear force can be prevented from being given to the resin, and a goodquality polyamide having a high molecular weight, a low water content and a suitably narrow molecular weight distribution can be produced.

EXAMPLES

The present invention is described in more detail with reference to the following Examples, but the invention is not limited to these Examples.

In the following Examples,
poly-1,3-bisaminomethylcyclohexaneadipamide is referred to as "N-1,3-BAC6",
poly-1,4-bisaminomethylcyclohexaneadipamide is as "N-1,4-BAC6",
poly-1,4-bisaminomethylcyclohexanesebacamide is as "N-1,4-BAC10",
poly-1,3-bisaminomethylcyclohexaneterephthalamide is as "N-1,3-BACT",
polymetaxylyleneadipamide is as "N-MXD6", and
polyparaxylylenesebacamide is as "N-PXD10".

The relative viscosity, the water content, the yellow index, the glass transition temperature and the melting point of the polyamide oligomer and the polyamide resin, as well as the molecular weight and the molecular weight distribution of the polyamide resin were measured as follows.

(1) Relative Viscosity 0.2 g of the polyamide oligomer or the polyamide resin was precisely weighed and dissolved in 20 ml of 96% sulfuric acid at 20° C. to 30° C. with stirring. After completely dissolved, 5 ml of the solution was quickly placed in a Cannon Fenske type viscometer, which was then allowed to stand in a thermostat chamber at 25° C. for 10 minutes, and then the dropping time (t) was measured. Further, the dropping time ($t_0$) of 96% sulfuric acid was measured in the same manner. The relative viscosity was calculated from t and to according to the following formula.

Relative Viscosity=$t/t_0$ (2) Water Content

Using a trace-level water content measurement device, AQ-2000 by Hiranuma Sangyo Co., Ltd., the water content was measured in a nitrogen atmosphere at 230° C. for 30 minutes.

(3) Yellow Index (YI)

Using a colorimeter, Z-Σ80 by Nippon Denshoku Industries Co., Ltd., the yellow index was measured according to a transmission method according to ASTM D1003.

(4) Molecular Weight Distribution (Mw/Mn)

The number-average molecular weight (Mn), the weight-average molecular weight (Mw) and the molecular weight distribution (Mw/Mn) can be measured according to gel permeation chromatography (GPC). Specifically, "HLC-8320GPC" by Tosoh Corporation was used as the device and two columns of "TSK gel Super HM-H" by Tosoh Corporation were used as the columns. As an eluent, used was hexafluoroisopropanol (HFIP) containing sodium trifluoroacetate in a concentration of 10 mmol/L. As the conditions for molecular weight distribution measurement, the resin or oligomer concentration was 0.02% by mass, the column temperature was 40° C. and the flow rate was 0.3 ml/min, and a refractive index detector (RI) was used. The molecular weight of the resin and the oligomer was determined as a standard polymethyl methacrylate-equivalent value.

(5) Glass Transition Temperature and Melting Point

Using a differential scanning calorimeter (trade name: DSC-60, by Shimadzu Corporation), the sample was subjected to DSC measurement in a nitrogen stream atmosphere at a heating rate of 10° C./min, and the glass transition temperature (Tg) and the melting point (Tm) thereof were measured.

The polyamide oligomer to be the starting material for the polyamide resin was produced according to the methods of the following Production Examples 1 to 7.

Production Example 1

Production of Polyamide Oligomer 1

9000 g (61.58 mol) of accurately-weighed adipic acid (by Asahi Kasei Chemicals Corporation), 8759.8 g (61.58 mol) of 1,4-bisaminomethylcyclohexane having a trans ratio of 62 mol % (by Koei Chemical Company, Limited), 12.7 g (0.0746 mol) of calcium hypophosphite, 4.90 g (0.0597 mol) of sodium acetate, and 6241 g of distilled water were charged into a pressure-resistant reactor having an internal volume of 50 L and equipped with a stirrer, a partial condenser, a total condenser, a pressure regulator, a thermometer, a driptank with a pump, an aspirator, a nitrogen-introducing pipe, a bottom drain valve, and a receiving pot for flushing oligomer, then fully purged with nitrogen, and thereafter the reactor was sealed up and heated up to 220° C. with stirring. In this stage, the internal pressure was 2.3 MPa. This was kept stirred for 2 hours at 220° C. under the internal pressure kept at 2.3 MPa. Subsequently, the stirring was stopped, and then the ball valve of the bottom drain valve was opened to ordinary pressure taking 90 seconds, and the slurry oligomer was taken out into the receiving pot through flushing. Next, this was dried at 150° C. for 5 hours using a vacuum drier, thereby giving 18 kg of a powdery oligomer of N-1,4-BAC6 (polyamide oligomer 1). The phosphorus atom-containing compound concentration in the polyamide oligomer 1 was 300 ppm in terms of the phosphorus atom concentration therein.

Production Example 2

Production of Polyamide Oligomer 2

A powdery oligomer of N-1,4-BAC10 (polyamide oligomer 2) was obtained in the same manner as in Production Example 1 except that sebacic acid (by Itoh Oil Chemicals Co., Ltd.) was used as the dicarboxylic acid component, and 1,4-bisaminomethylcyclohexane having a trans ratio of 80 mol % (by Koei Chemical Company, Limited) was used as the diamine component. The phosphorus atom-containing compound concentration in the polyamide oligomer 2 was 300 ppm in terms of the phosphorus atom concentration therein.

Production Example 3

Production of Polyamide Oligomer 3

A powdery oligomer of N-1,3-BAC6 (polyamide oligomer 3) was obtained in the same manner as in Production Example 1 except that 1,3-bisaminomethylcyclohexane having a cis ratio of 70 mol % (by Mitsubishi Gas Chemical Company, Inc.) was used as the diamine component, sodium hypophosphite was used in place of calcium hypophosphite, the amount of sodium hypophosphite was 15.8 g (0.149 mol) and the amount of sodium acetate was 9.76 g (0.119 mol). The phosphorus atom-containing compound concentration in the polyamide oligomer 3 was 300 ppm in terms of the phosphorus atom concentration therein.

Production Example 4

Production of Polyamide Oligomer 4

A powdery oligomer of N-PXD10 (polyamide oligomer 4) was obtained in the same manner as in Production Example 1 except that paraxylylenediamine (by Showa Denko K.K.) was used as the diamine component and sebacic acid (by Itoh Oil Chemicals Co., Ltd.) was used as the dicarboxylic acid component. The phosphorus atom-containing compound concentration in the polyamide oligomer 4 was 300 ppm in terms of the phosphorus atom concentration therein.

Production Example 5

Production of Polyamide Oligomer 5

A powdery oligomer of N-1,3-BACT (polyamide oligomer 5) was obtained in the same manner as in Production Example 1 except that 1,3-bisaminomethylcyclohexane having a cis ratio of 70 mol % (by Mitsubishi Gas Chemical Company, Inc.) was used as the diamine component, and high-purity terephthalic acid (by Mizushima Aroma Co., Ltd.) was used as the dicarboxylic acid component. The phosphorus atom-containing compound concentration in the polyamide oligomer 5 was 300 ppm in terms of the phosphorus atom concentration therein.

Production Example 6

Production of Polyamide Oligomer 6

A powdery oligomer of N-MXD6 (polyamide oligomer 6) was obtained in the same manner as in Production Example 1 except that metaxylylenediamine (by Mitsubishi Gas Chemical Company, Inc.) was used as the diamine component, adipic acid (by Asahi Kasei Corporation) was used as the dicarboxylic acid component, sodium hypophosphite was used in place of calcium hypophosphite, the amount of sodium hypophosphite was 0.0735 mol and the amount of sodium acetate was 0.0588 mol. The phosphorus atom-containing compound concentration in the polyamide oligomer 6 was 150 ppm in terms of the phosphorus atom concentration therein.

Production Example 7

Production of Polyamide Oligomer 7

A powdery oligomer of N-1,4-BAC6 (polyamide oligomer 7) was obtained in the same manner as in Production Example 1 except that the drying condition with the vacuum drier was at 150° C. and for 2 hours.

Table 1 shows the measurement results of the relative viscosity, the water content and the yellow index of the polyamide oligomers 1 to 7.

TABLE 1

| | | | unit | Production Example 1 | Production Example 2 | Production Example 3 | Production Example 4 | Production Example 5 | Production Example 6 | Production Example 7 |
|---|---|---|---|---|---|---|---|---|---|---|
| No. of Polyamide Oligomer | | | | 1 | 2 | 3 | 4 | 5 | 6 | 7 |
| Charged Monomers | Aromatic Diamine | metaxylylenediamine | mol | | | | | | 61.58 | |
| | | paraxylylenediamine | mol | | | | 61.58 | | | |
| | Alicyclic Diamine | 1,3-bisaminomethylcyclohexane | mol | | | 61.58 | | 61.58 | | |
| | | 1,4-bisaminomethylcyclohexane | mol | 61.58 | 61.58 | | | | | 61.58 |
| | Aliphatic Dicarboxylic Acid | adipic acid | mol | 61.58 | | 61.58 | | | 61.58 | 61.58 |
| | | sebacic acid | mol | | 61.58 | | 61.58 | | | |
| | Aromatic Dicarboxylic Acid | terephthalic acid | mol | | | | | 61.58 | | |
| Properties | Relative Viscosity | | | 1.1 | 1.1 | 1.2 | 1.1 | 1.1 | 1.1 | 1.1 |
| | Water Content | | % | 1.3 | 1.3 | 1.5 | 1.3 | 1.2 | 0.9 | 4.2 |
| | Yellow Index | | | 4.2 | 4.5 | 5.1 | 4.4 | 3.1 | 3.4 | 3.2 |

Next, in Examples 1 to 6 and Comparative Examples 1 and 2, using an extruder, the above-mentioned polyamide oligomer 1 to 7 each was melt-kneaded to obtain a polyamide resin through polycondensation. In Examples and Comparative Examples, used was HYPER KTX30 by Kobe Steel, Ltd., in which plural barrels were assembled to construct one extruder. This extruder is an intermeshed co-rotation twin screw extruder, in which L/D (L: screw length, D: screw diameter) was 74.4, and the cylinder major diameter φ in the front view of the cylinder was 30 mm.

Example 1

Figure 7:
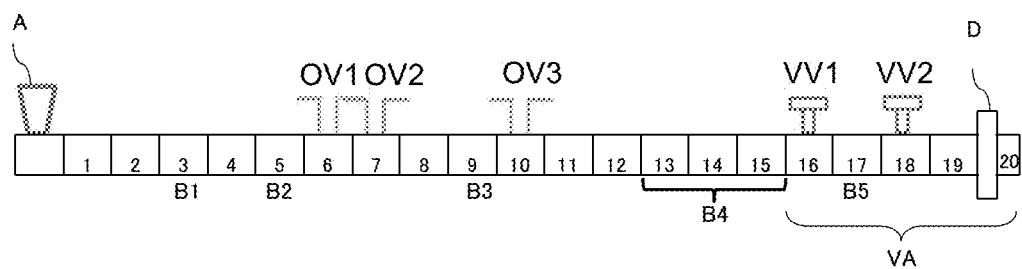
FIG. 7 is a schematic view showing the extruder used in Examples 1 to 6 and Comparative Example 1.

As shown in FIG. 7, the extruder comprised 20 barrels (including a die D) connected to a barrel equipped with the supply section A with a hopper, in which, from the supply section A side, the 6th, 7th and 10th barrels were provided with open vents OV1 to OV3, and the 16th and 18th barrels were provided with vacuum vents VV1 and VV2, respectively. In addition, in the 3rd, 5th and 9th barrels, a kneading disc element having a large disc width was attached to the respective screws, and a full-flight reverse screw was connected thereto on the downstream side, thereby providing the kneading sections B1 to B3. In the 13th to 15th barrels, a kneading disc element was attached to the screw and a full-flight reverse screw was connected thereto on the most downstream side, thereby providing the kneading section B4. In the 17th barrel, the screw was provided with a rotor, and a full-flight reverse screw was connected thereto on the downstream side, thereby providing the kneading section B5. Accordingly, the barrels 16 to 20 formed the vacuum area VA, and the length thereof was 25% of the total screw length. The screws in the other barrels than those of the kneading sections B1 to B5 were double-thread flight screw elements to constitute conveyance sections.

Under the extrusion condition mentioned below, the polyamide oligomer 1 was charged into the extruder via the hopper of the supply section A, using a feeder, and the reaction through extrusion was conducted while dry nitrogen was always introduced into the extruder through the hopper, thereby obtaining a polyamide resin 1. The temperature of the resin at the outlet was 306° C. The extrusion condition is as mentioned below.

<Extrusion Condition>
Feeder Rate: 10 kg/h
Screw Rotation Number: 200 rpm
Preset Temperature (° C.): C1/C2/C3 to C16/C17 to C19/C20=260/320/310/300/300
Vacuum Degree in Vacuum Vents VV1 and VV2: 150 Torr
*C1 to C20 each indicate the preset temperature in the 1st to 20th barrels, respectively.

Example 2

A polyamide resin 2 was obtained in the same manner as in Example 1 except that the polyamide oligomer 2 was used and reaction through extrusion was conducted under the extrusion condition mentioned below. The temperature of the resin at the outlet was 316° C.

<Extrusion Condition>
Feeder Rate: 20 kg/h
Screw Rotation Number: 200 rpm
Preset Temperature (° C.): C1/C2/C3 to C16/C17 to C19/C20=240/300/300/290/290
Vacuum Degree in Vacuum Vents VV1 and VV2: 100 Torr Example 3

A polyamide resin 3 was obtained in the same manner as in Example 1 except that the polyamide oligomer 3 was used and reaction through extrusion was conducted under the extrusion condition mentioned below. The temperature of the resin at the outlet was 245° C.

<Extrusion Condition>
Feeder Rate: 10 kg/h
Screw Rotation Number: 100 rpm
Preset Temperature (° C.): C1/C2/C3 to C16/C17 to C19/C20=220/250/250/240/240
Vacuum Degree in Vacuum Vents VV1 and VV2: 100 Torr Example 4

A polyamide resin 4 was obtained in the same manner as in Example 1 except that the polyamide oligomer 4 was used and reaction through extrusion was conducted under the extrusion condition mentioned below. The temperature of the resin at the outlet was 302° C.

<Extrusion Condition>
Feeder Rate: 20 kg/h
Screw Rotation Number: 200 rpm
Preset Temperature (° C.): C1/C2/C3 to C16/C17 to C19/C20=260/300/300/290/290
Vacuum Vents VV1 and VV2: 90 Torr Example 5

A polyamide resin 5 was obtained in the same manner as in Example 1 except that the polyamide oligomer 5 was used and reaction through extrusion was conducted under the extrusion condition mentioned below. The temperature of the resin at the outlet was 362° C.

<Extrusion Condition>
Feeder Rate: 10 kg/h
Screw Rotation Number: 100 rpm
Preset Temperature (° C.): C1/C2/C3 to C16/C17 to C19/C20=320/350/350/350/350
Vacuum Degree in Vacuum Vents VV1 and VV2: 160 Torr Example 6

A polyamide resin 6 was obtained in the same manner as in Example 1 except that the polyamide oligomer 6 was used and reaction through extrusion was conducted under the extrusion condition mentioned below. The temperature of the resin at the outlet was 262° C.

<Extrusion Condition>
Feeder Rate: 30 kg/h
Screw Rotation Number: 200 rpm
Preset Temperature (° C.): C1/C2/C3 to C16/C17 to C19/C20=240/260/260/240/240
Vacuum Degree in Vacuum Vents VV1 and VV2: 96 Torr Comparative Example 1

Reaction through extrusion was attempted according to the same method as in Example 1 except that the polyamide oligomer 7 was used and the extrusion condition was following. However, owing to the large water content of the polyamide oligomer, a large amount of water blew out from the open vents and water vapor flowed backward in the direction to the hopper, and the powdery oligomer caused a problem of vent-up inside the extruder and caked therein and could not be extruded out.

<Extrusion Condition>
Feeder Rate: 10 kg/h
Screw Rotation Number: 200 rpm
Preset Temperature (° C.): C1/C2/C3 to C16/C17 to C19/C20=260/320/310/300/300
Vacuum Degree in Vacuum Vents VV1 and VV2: Vacuuming was impossible.

Comparative Example 2

Figure 8:
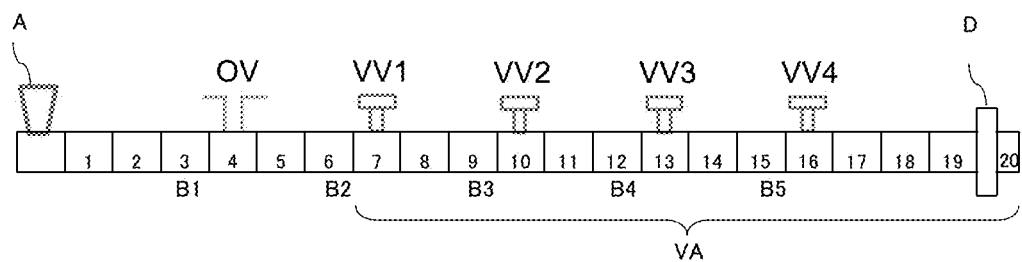
FIG. 8 is a schematic view showing the extruder used in Comparative Example 2.

As shown in FIG. 8, the extruder comprised 20 barrels (including a die D) connected to a barrel equipped with the supply section A with a hopper, in which the 4th barrel was provided with an open vent OV1, and the 7th, 10th, 13th and 16th barrels were provided with vacuum vents VV1 to VV4, respectively. In each of the 3rd, 6th, 9th and 12th barrels, a kneading disc element having a large disc width was attached to the respective screw and a full-flight reverse screw was connected thereto on the downstream side, thereby providing the kneading sections B1 to B4. A rotor was attached to the screw at the position of the 15th barrel and a full-flight reverse screw was connected thereto on the downstream side, thereby providing the kneading section B5. Accordingly, the barrels 7 to 20 formed the vacuum area VA, and the length thereof was 70% of the total screw length. The screws in the other barrels than those of the kneading sections B1 to B5 were double-thread flight screw elements.

Under the extrusion condition mentioned below, the polyamide oligomer 1 was charged into the extruder via the hopper of the supply section A, using a feeder, and reaction through extrusion was conducted while dry nitrogen was always introduced into the extruder through the hopper. However, since the oligomer could not be sufficiently melted before reaching the vacuum area VA, a large amount of the oligomer adhered to the walls of the vacuum vents and clogged them, and therefore the extrusion was impossible.

<Extrusion Condition>

Feeder Rate: 10 kg/h
Screw Rotation Number: 200 rpm
Preset Temperature (° C.): C1/C2/C3 to C16/C17 to C19/C20=260/320/310/300/300
Vacuum Degree in Vacuum Vents: Vacuum vents clogged.

The relative viscosity, the water content, the yellow index, the number-average molecular weight (Mn), the weight-average molecular weight (Mw), the glass transition temperature and the melting point of the polyamide resins obtained in Examples and Comparative Examples were measured. The results are shown in Table 2.

TABLE 2

| | unit | Example 1 | Example 2 | Example 3 | Example 4 | Example 5 | Example 6 | Comparative Example 1 | Comparative Example 2 |
|---|---|---|---|---|---|---|---|---|---|
| No. of Oligomer | | 1 | 2 | 3 | 4 | 5 | 6 | 7 | 1 |
| Relative Viscosity | | 2.2 | 2.3 | 2.0 | 2.4 | 2.1 | 2.5 | Extrusion impossible | Extrusion impossible |
| Water Content | % | 0.05 | 0.06 | 0.05 | 0.04 | 0.06 | 0.05 | | |
| Yellow Index | ° C. | 23 | 17 | 5 | 27 | 21 | 3 | | |
| Number-Average Molecular Weight (Mn) | | 23112 | 24636 | 17814 | 36360 | 23553 | 37567 | | |
| Weight-Average Molecular Weight (Mw) | | 45653 | 44532 | 35596 | 68688 | 45531 | 76320 | | |
| Mw/Mn | | 2.0 | 1.8 | 2.0 | 1.9 | 1.9 | 2.0 | | |
| Glass Transition Temperature Tg | ° C. | 112 | 93 | 103 | 74 | 187 | 87 | | |
| Melting Point Tm | ° C. | 301 | 270 | 232 | 290/281 | 349 | 237 | | |

* In Example 4, the sample had two melting point peaks.

In the methods of Examples 1 to 6, polyamides having a sufficiently increased molecular weight, a suitable molecular weight distribution and a good color were obtained. On the other hand, in the methods of Comparative Examples 1 and 2, a polyamide could not be obtained owing to extrusion trouble.

REFERENCE SIGNS LIST

A Supply Section
B1 to B5 Kneading Section
D Die
E1 to E4 Conveyance Section
OV1 to OV3 Open Vent
VA Vacuum Area
VV1 to VV4 Vacuum Vent
X Kneading Element
Y Pressure-Decreasing Element

The invention claimed is:

1. A polyamide resin production method for producing a polyamide resin through polycondensation of a polyamide oligomer, the polyamide oligomer comprising a diamine unit containing 70 mol % or more of a diamine unit selected from an aromatic diamine unit represented by the following general formula (I-1) and an alicyclic diamine unit represented by the following general formula (I-2); and a dicarboxylic acid unit containing 50 mol % or more of a dicarboxylic acid unit selected from a linear aliphatic dicarboxylic acid unit represented by the following general formula (II-1) and an aromatic dicarboxylic acid unit represented by the following general formula (II-2), wherein
    in the production method, the polyamide oligomer having a relative viscosity of from 1.1 to 1.3 and a water content of 3% by mass or less is melt-kneaded to produce the polyamide resin through polycondensation, using an intermeshed co-rotation twin screw extruder having at least one open vent and at least one vacuum vent, and
    a pressure-decreasing element is provided at a position nearer to the supply section side than a position at which the vacuum vent is provided, and an area of 30% or less of the total screw length is a vacuum area having a pressure of 300 Torr or less in the extruder:

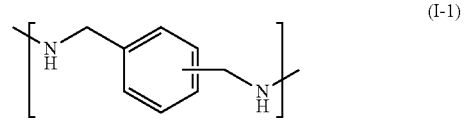
(I-1)

-continued

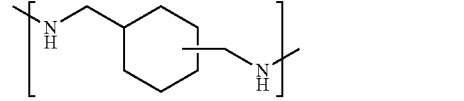
(I-2)

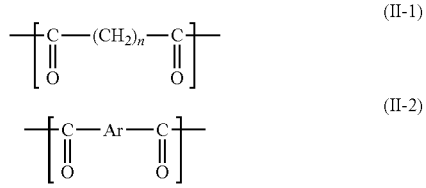
(II-1)

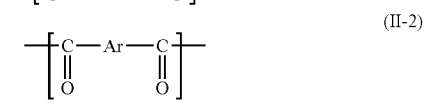
(II-2)

wherein, in the general formula (II-1) n indicates an integer of from 2 to 18, and in the general formula (II-2) Ar represents an arylene group.

2. The polyamide resin production method according to claim 1, wherein a relative viscosity of the polyamide resin is from 1.8 to 4.0.

3. The polyamide resin production method according to claim 1, wherein a molecular weight distribution (Mw/Mn) of the polyamide resin is from 1.8 to 2.5.

4. The polyamide resin production method according to claim 1, wherein a phosphorus compound is blended in the polyamide oligomer in an amount of from 10 to 500 ppm in terms of the phosphorus atom concentration.

5. The polyamide resin production method according to claim 1, wherein the open vent is arranged nearer to the supply section side than the vacuum area.

6. The polyamide resin production method according to claim 1, wherein a kneading section that kneads the polyamide oligomer is provided both in the vacuum area and in a position nearer to the supply section side than the vacuum area.

7. The polyamide resin production method according to claim 1, wherein at least one vacuum vent is provided in an area of 25% or less of the total screw length from an end on the die side of the extruder.

8. The polyamide resin production method according to claim 1, wherein a kneading section that comprises a kneading element having strong distributive mixing performance is provided in the area of 25% or less of the total screw length from an end on the die side of the extruder.

9. The polyamide resin production method according to claim 1, wherein a kneading section that kneads the polyamide oligomer is provided in a position nearer to the supply section side than the vacuum area and the kneading section comprises a kneading element having strong dispersive mixing performance.

* * * * *